Nov. 28, 1961     E. P. PEREGRINE     3,010,641
PLANT FOR PRODUCING HIGHLY COMPRESSED AIR
Filed Jan. 16, 1957     6 Sheets-Sheet 3
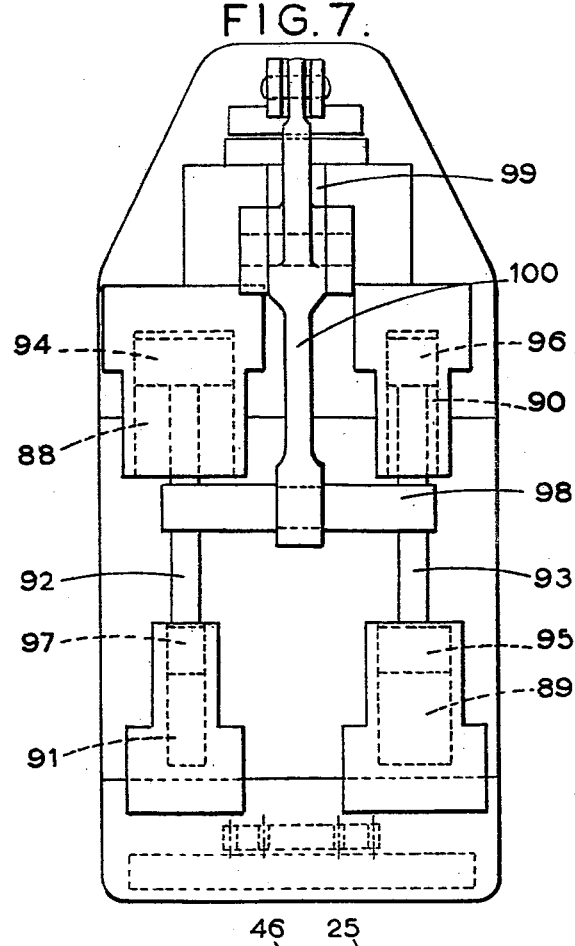
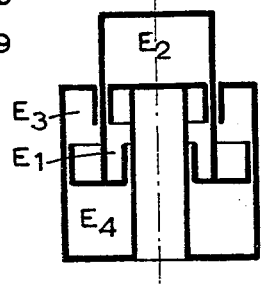
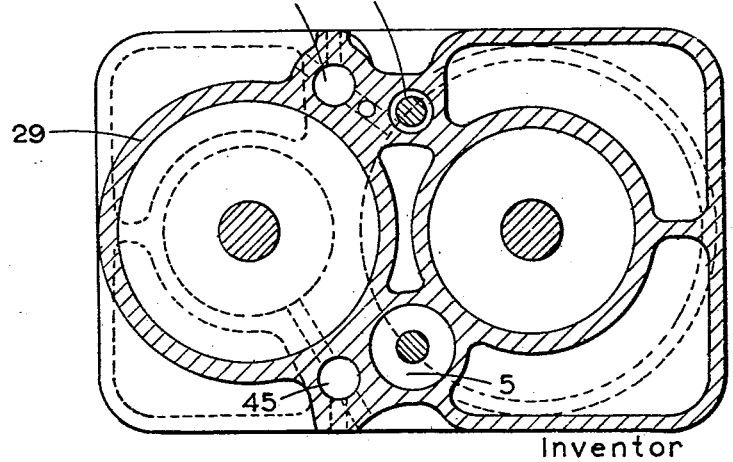
Inventor
EDGAR P. PEREGRINE
BY Leon M. Strauss AGT.

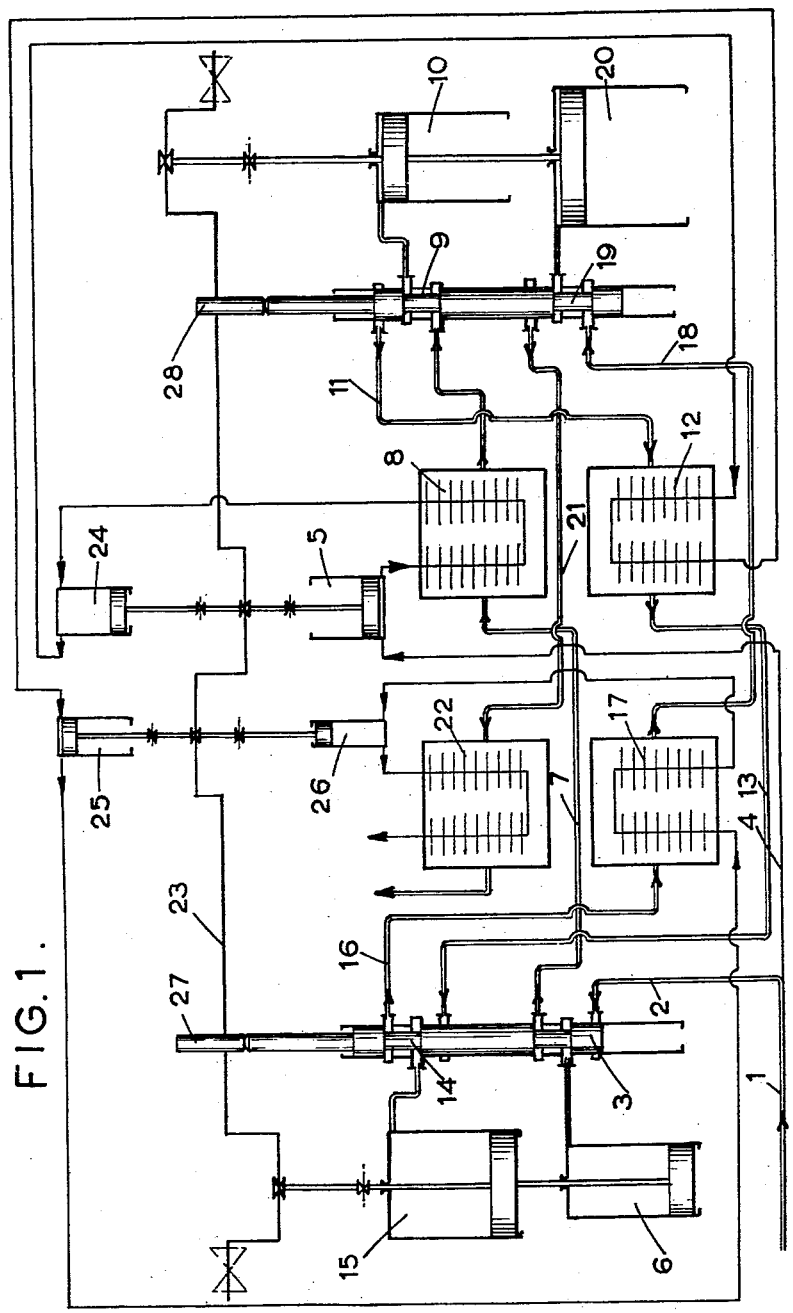

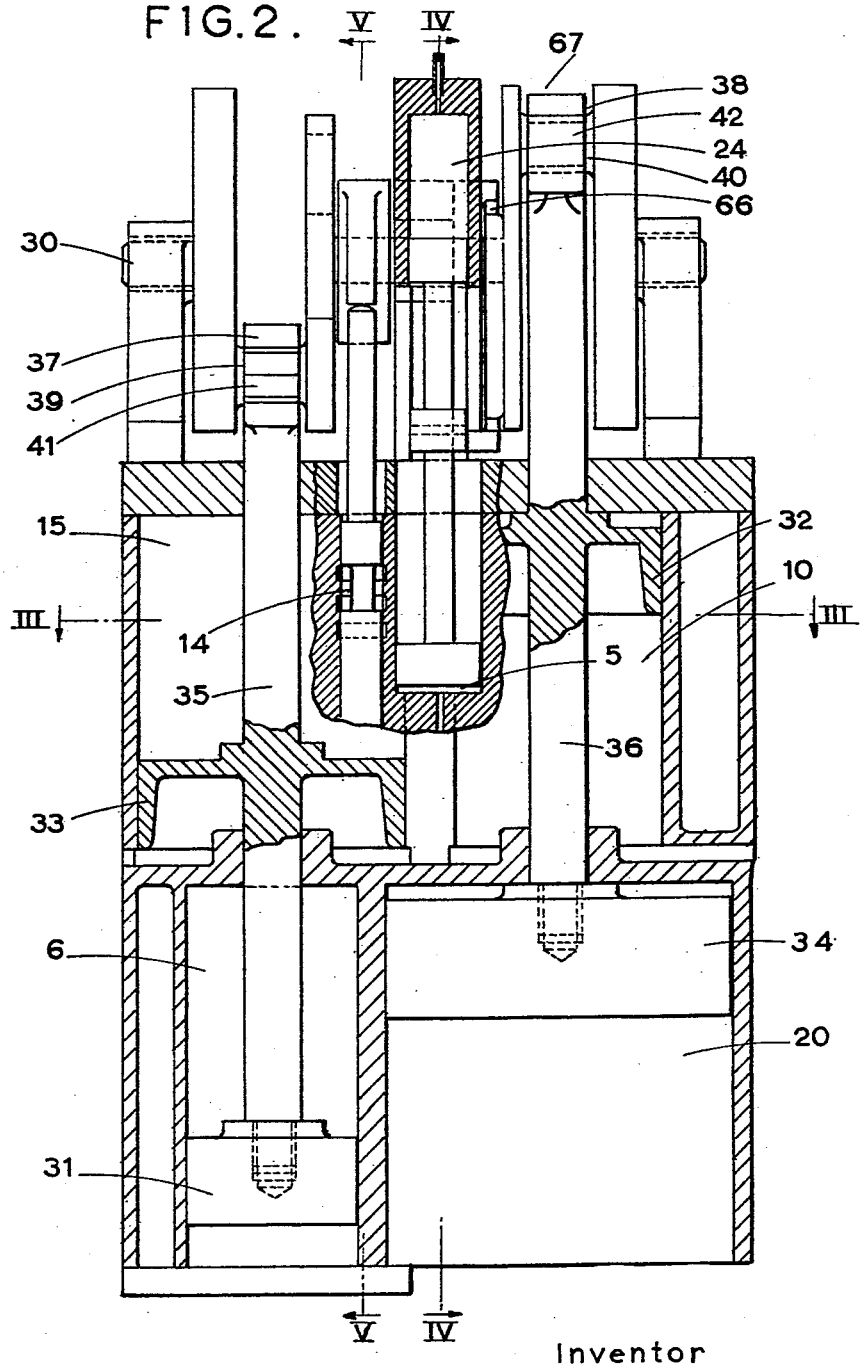

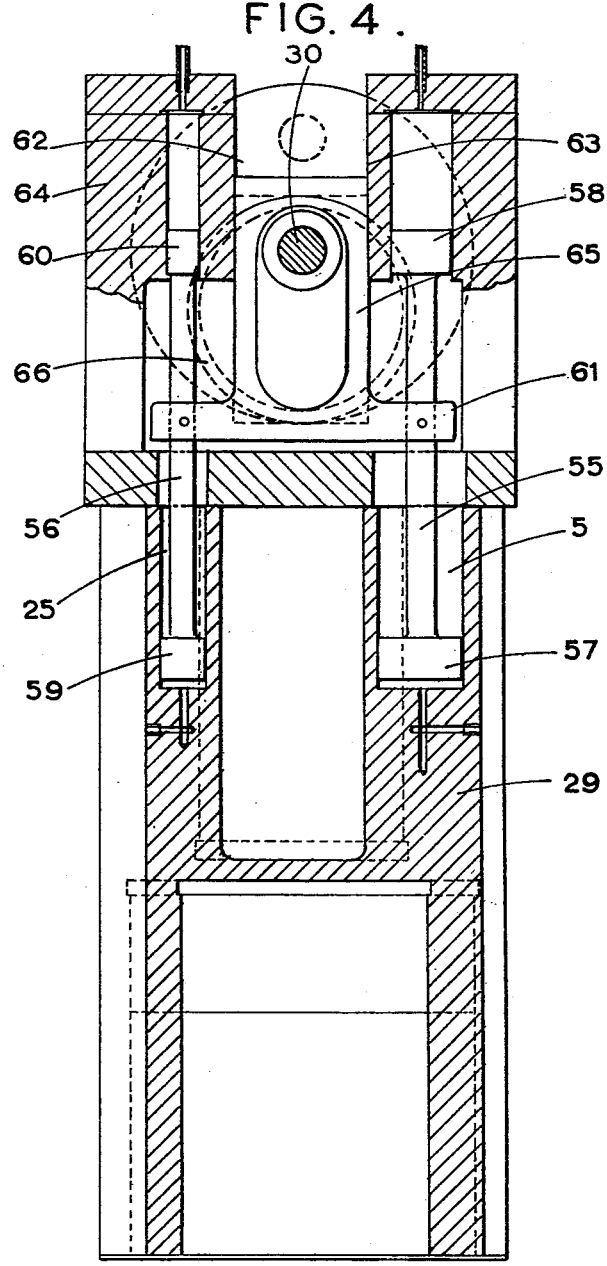

Nov. 28, 1961    E. P. PEREGRINE    3,010,641
PLANT FOR PRODUCING HIGHLY COMPRESSED AIR
Filed Jan. 16, 1957    6 Sheets-Sheet 5

Inventor

EDGAR P. PEREGRINE
BY *Leon M. Strauss*, AGT.

Nov. 28, 1961     E. P. PEREGRINE     3,010,641
PLANT FOR PRODUCING HIGHLY COMPRESSED AIR
Filed Jan. 16, 1957     6 Sheets-Sheet 6

Inventor
EDGAR P. PEREGRINE
BY: Leon M. Strauss, AGT.

United States Patent Office 3,010,641
Patented Nov. 28, 1961

3,010,641
PLANT FOR PRODUCING HIGHLY
COMPRESSED AIR
Edgar P. Peregrine, Fox Hall, Kelshall, Royston, England
Filed Jan. 16, 1957, Ser. No. 634,577
Claims priority, application Great Britain Jan. 17, 1956
2 Claims. (Cl. 230—51)

The invention relates to a plant for producing highly compressed air, in particular to a plant for supplying highly compressed air for powering jet engine auxiliaries and also for other purposes where high pressure air is to be produced in a confined space.

Normally compressors for such and similar purposes are shaft driven from the engine or by a hydraulic or electric motor. The temperature rise in the compressor is usually dispelled by ventilation, for instance, by fan cooling.

One object of the invention is to provide a plant for producing highly compressed air using compressed air of medium pressure as a driving means.

Another object of the invention resides in the provision of a plant for producing highly compressed air not requiring ventilation.

A further object of the invention is a plant for producing highly compressed air combining driving engine and compressor in a single compact unit of small size and weight.

A further object of the invention resides in means conducive to producing highly compressed air which means are of great flexibility of operation even in extremes of ambient temperatures.

A further object of the invention is a plant for producing highly compressed air in which the receiver pressure is automatically maintained, its capacity being determined by its duty.

These and other objects are achieved according to the invention by a plant comprising a multi-expansion air motor, a multi-stage compressor and heat exchangers combined in a single unit. The air motor and compressor are preferably designed as rotary engines. The air motor and compressor may also be designed as reciprocating machines. Further, the compressor and/or air motor may be a combination of reciprocating and rotary types. The air expanded in one stage of the air motor is used for cooling the air coming from a stage of the compressor which in turn reheats the expanded air. The heat exchangers can be arranged together with the air motor and the compressor in a single compact unit thus permitting efficiency in a minimum of space. Such a plant may readily be applied to industrial compressed air mains for the purpose of producing high pressure air and does not require special driving means or coolers.

In the case of a jet engine, compressed air of medium pressure and temperature is available for driving an air motor. Thus air from the main jet engine manifold can be fed jointly to the air motor and to the compressor, so that, for instance, a greater part of the compressed air is passed to the air motor and a smaller part of compressed air to the compressor.

Two embodiments of a plant with a quadruple expansion motor and with a four-stage compressor according to the invention are shown by way of example in the accompanying drawings, in which:

FIG. 1 is a flow diagram of a unit comprising a single acting quadruple air motor, a four-stage compressor and heat exchangers.

FIG. 2 is a cross section and part elevation of a unit having a single acting air motor part of the section being shown in a plane at an angle to the plane of the main section.

FIG. 3 is a cross section through the same unit at right angles to the main section shown in FIG. 2 along the line 3—3.

FIG. 4 is a cross section through the unit at right angles to the section shown in FIG. 2 along the line 4—4.

FIG. 7 is an elevation of the unit shown in FIG. 6 as seen from the compressor side.

FIG. 9 is a diagram of the basic cylinder arrangement showing the different stages in the quadruple expansion motor.

Figure 5:
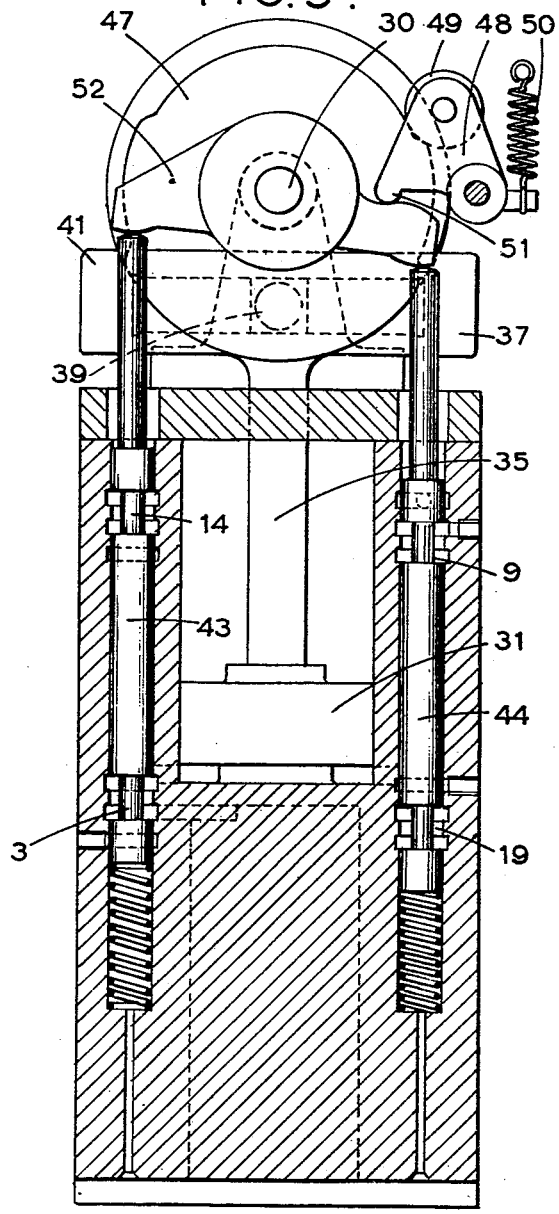
FIG. 5 is a cross section through the unit parallel to the section shown in FIG. 4 along the line 5—5 in FIG. 2.

It is assumed that compressed air for driving the air motor is available at a pressure of 135 lbs./sq. in. and at a temperature of 200 deg. C. Five parts of air by weight are passed to the air motor for one part of air by weight passed to the compressor. These figures are chosen as a theoretical basis for the design of the compressor and its driving motor and are not meant to be restrictive. The five parts of air fed to the motor are expanded to atmospheric pressure to compress the one part fed to the compressor up to 3300 lbs./sq. in. The flow diagram, FIG. 1, shows the air fed from inlet 1 partly through conduit 2 to valve 3 and partly through conduit 4 to the first cylinder 5 of the compressor. The air passes from valve 3 to the first cylinder 6 of the air motor.

The air expanded in the first cylinder 6 passes through valve 3 and conduit 7 to the first heat exchanger 8 and then on to valve 9 and the second cylinder 10 of the air motor. As valve 3 opens the conduit 7 at the end of the expansion stroke and valve 9 opens at the beginning of the expansion stroke, the two stages have to be 180 deg. out of phase. This applies to all adjacent stages. If an inlet is closed before the end of the working stroke, for instance, at ⅔ of the stroke, and the preceding exhaust simultaneously, then the air remaining in the preceding cylinders will have a cushioning effect on the piston.

The air passes on in the same sequence from cylinder 10 back through valve 9 and conduit 11 to the second heat exchanger 12 and thence through conduit 13 and valve 14 to the third cylinder 15, back through the valve 14 and conduit 16 to the third heat exchanger 17, conduit 18 and valve 19 to the fourth cylinder 20, back through valve 19, and through conduit 21 and the last heat exchanger 22 into the atmosphere. In each exchanger the expanding air is re-heated.

The movement of the four pistons in cylinders 6, 10, 15 and 20 causes rotation of the crankshaft 23 and thus reciprocates the four pistons in compression cylinders 5, 24, 25 and 26. The path of the air compressed in four stages from the first cylinder 5 through heat exchanger 8, second cylinder 24, heat exchanger 12, third cylinder 25, heat exchanger 17, fourth cylinder 26 and heat exchanger 22 to a reservoir is marked by arrows on a single line. In each exchanger the portion of air that is compressed is cooled, heat being transferred to the portion of air that expands in the engine stages.

The spring loaded valves 3, 9, 14 and 19 are controlled by cams 27 and 28 on crankshaft 23. The diagram represents the stage at which compressed air is admitted to cylinders 10 and 20 and the exhaust of cylinders 6 and 15 is opening. Although the stages of compressor and engine are reciprocating in FIG. 1 rotary turbo elements are also suitable.

In the single acting motor shown in diagrammatic sections in FIGS. 2 to 5, the expansion cylinders numbered 6, 10, 15, 20 as in the flow diagram are all arranged in a single block 29, which also contains two bores for the compression cylinders 5 and 25 and two bores for the valves controlling the admission of air and the exhaust to the heat exchangers including the conduits for all four expansion cylinders. The part section FIG. 2 at an angle to the main cross section shows compression cylinders 5 and 24 and one of the valves 14 with the valve operating mechanism on a crankshaft 30. Pistons 31, 32, 33, 34 in expansion cylinders 6, 10, 15, 20 are arranged on two piston rods 35, 36 so that pistons 31 and 33 work on one rod and pistons 32 and 34 on the other rod whereby mounting is facilitated by making the inner pistons 32 and 33 integral with their respective piston rods 35 and 36 and connecting as by screwing the outer pistons 31 and 34 to these piston rods.

The conversion of the reciprocating movement of the piston rods 35 and 36 into the rotary movement of crankshaft 30 is effected by a Scotch yoke mechanism. The rods 35 and 36 carry slotted crossheads 37, 38 pivoted on the crankpins 39 and 40 in blocks 41, 42.

The control valves 3, 9, 14, 19 which open and close inlet and outlet of the expansion cylinders of the air motor in sequence 180 deg. out of phase, are arranged in pairs on spring biased valve spindles 43 and 44 guided in bores 45 and 46 in block 29. They are actuated by cam 47 on crankshaft 30 through triangular roller block 48 with roller 49 held in contact with the cam surface by spring 50. The rocking movement of the roller block 48 is transmitted through rounded nose 51 on block 48 to double rocking lever 52 engaging spring biased valve stems 53 and 54.

The four compression cylinders 5, 24, 25, 26 (FIG. 4) are also arranged in pairs in tandem and the piston rods 55, 56 of piston 57, 58, 59, 60 form with the connecting cross bar 61 an H-like structure partly in the space between the air motor cylinders and partly to both sides of the crankshaft. Guiding faces 62 and 63 are provided in the head 64 above cylinder block 29. The cross bar 61 has a central extension 65 engaging the guiding faces 62, 63. The reciprocation is produced through eccentric spigot 66 on crankshaft 30 engaging oscillating spigot 67 on extension 65. The space for heat exchangers is not shown in the figures relating to the first embodiment of the invention.

Figure 6:
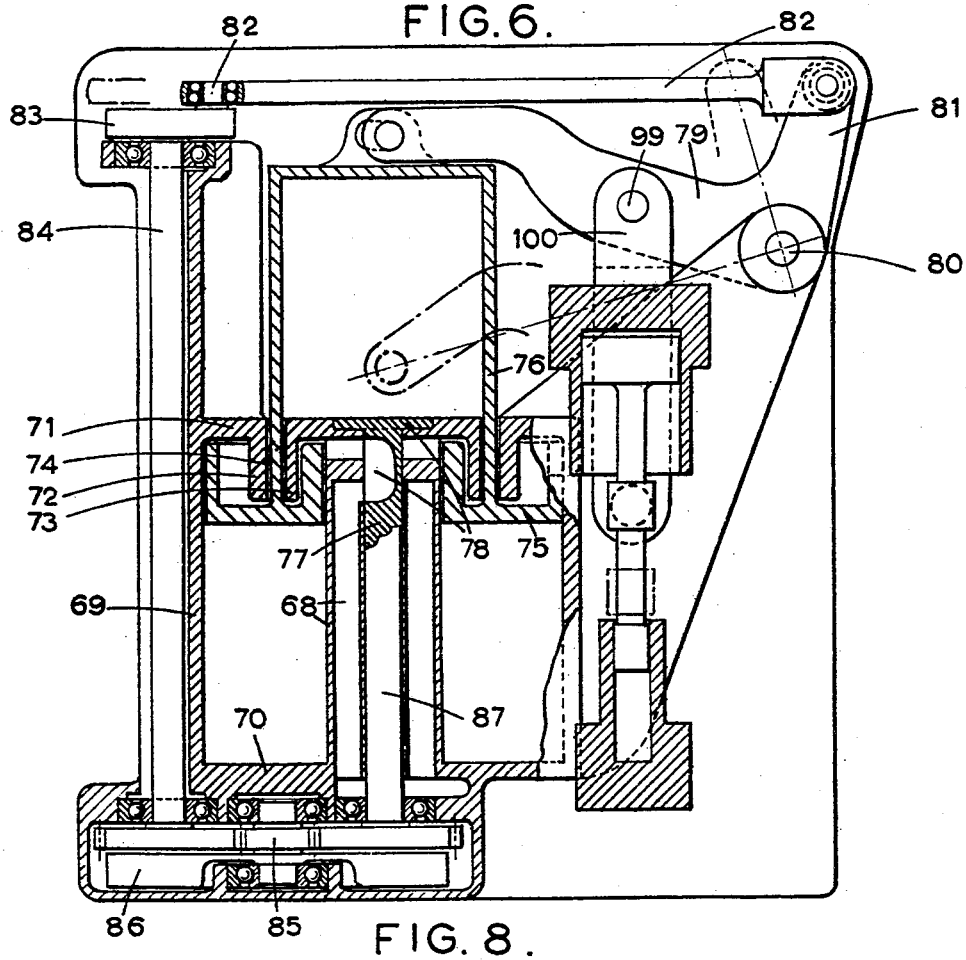
FIG. 6 is a cross section through a second embodiment of a unit according to the invention showing a double acting composite air motor with compressor.
Figure 8:
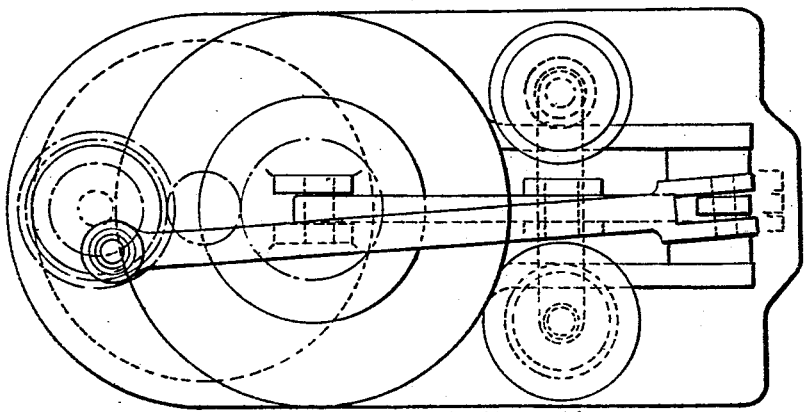
FIG. 8 is a plan of the unit shown in FIG. 6.

In the second embodiment represented in FIGURES 6 to 8, a power crankshaft is dispensed with and the reciprocating movement of the double acting expansion cylinders directly transmitted to the compressing cylinders. The compact basic cylinder arrangement is shown in FIG. 9. In the first stage, expansion takes place in the inner annular portion $E_1$, in the second stage in the upper cylindrical portion $E_2$, in the third stage in the outer annular portion $E_3$ and in the fourth expansion stage in the lower annular portion $E_4$.

The cylinder block is composed of an inner tubular column 68, an outer barrel portion 69, a lower and upper head 70, 71, the upper two-part head 71 having an interior tubular projection 72 on its outer part and a similar projection 73 on its inner part between which an annular slot 74 is formed. To simplify the drawing, the block is shown as a one-piece structure although, of course, it is built up of several components in any known manner.

The axially movable cylinder parts are also shown as a one piece structure although they likewise consist of several parts suitably produced and conencted as known in the art. The movable structure is composed of an annular bottom portion 75 of U-shaped cross section attached to a downwardly open cylindrical cup-shaped portion 76. Portion 75 fits into the space between column 68 and barrel 69, while the cylindrical cup-shaped portion 76 reaches through the annular slot 74 from above the head 71 into the barrel 69. Column 68 serves as guide for rotary valve 77 with distributor slots 78. The drawing shows the movable structure in upper position, i.e. after expansion of the air during the second and the fourth stage.

The reciprocation of the movable structure is transmitted through lever 79 pivoted at 80 on the bracket attached to the cylinder block. The dash-dotted lines show the position of lever 79 when the movable structure is in the lowermost position, i.e. after expansion of the air in the first and third stage.

The lever 79 is a bell crank lever with arm 81 connected through rod 82 to crank pin 82 on disc 83 on top of valve gear spindle 84. The transmission mechanism 85 consists of three intermeshing gear wheels, the centre wheel spindle of which carries a flywheel 86. The inner wheel of the transmission gear is connected to the stem 87 of the rotary valve 77.

Adjacent the cylinder structure and parallel to its longitudinal axis is arranged the four stage compressor. The compressor cylinders 88, 89, 90, 91 are again mounted in pairs in tandem providing mutual guidance for the two piston rods 92 and 93 connected to pistons 94 and 97 in cylinders 88 and 91 and to pistons 95 and 96 in cylinders 89 and 90 respectively; the numerical order shows the flow of compressed air through the four compression stages. The rods together with cross bar 98 form an H-shaped rigid frame reciprocated by the rocking lever 79 through pin 99 and links 100.

The heat exchangers are not shown. They are to be mounted partly inside column 68 and in the open spaces of the housing adjacent the compressor. The heat exchangers are of the type pertaining to fluid temperature interchange known in the art.

An excess of expanded cooled air may be used for other cooling purposes as, for instance, for refrigeration. No auxiliary air flow and no special control valves are required for the system. The quadruple air motor, the four-stage compressor, and the heat exchangers serving as reheaters and intercoolers form a single compact unit of minimum size and maximum efficiency without requiring special ventilation. When using the unit for powering auxiliaries of a jet engine electro-pneumatic controls, air receivers, pneumatic jacks and motors would form the complete auxiliary power system.

I claim:
1. Plant for producing highly compressed air comprising a multi-stage compressor, a multi-stage air motor driving said compressor, said air motor having a number of stages of expansion corresponding to the number of stages of compression of the compressor, a plurality of heat exchangers at least one interposed between each of the stages of the multi-stage compressor and the multi-stage air motor, conduits leading compressed air from one stage of the compressor to the next stage of the compressor through one part of the appropriate interposed heat exchanger, and conduits leading expanded air from one stage of the air motor to the next stage of the air motor through another part of the appropriate interposed heat exchanger passed by the corresponding stream of compressed air, the heat interchanged involving substantially all the temperature drop in the air motor and substantially all the temperature rise in the compressor.

2. Plant as claimed in claim 1, in which the air motor is a multi-cylinder reciprocating engine.

References Cited in the file of this patent

UNITED STATES PATENTS

| | | |
|---|---|---|
| 640,238 | Svenson | Jan. 2, 1900 |
| 1,008,519 | Barr | Nov. 14, 1911 |
| 1,039,616 | Tuma | Sept. 24, 1912 |
| 1,607,234 | Brown | Nov. 16, 1926 |
| 1,613,904 | Ritz-woller | Jan. 11, 1927 |
| 1,927,497 | Hunaeus | Sept. 19, 1933 |
| 1,951,751 | Cooper | Mar. 20, 1934 |
| 2,741,422 | Kockritz et al. | Apr. 10, 1956 |
| 2,765,976 | Stewart | Oct. 9, 1956 |
| 2,767,561 | Seeger | Oct. 23, 1956 |
| 2,791,370 | Schemmel | May 7, 1957 |

FOREIGN PATENTS

| | | |
|---|---|---|
| 810,898 | Germany | Aug. 13, 1951 |